No. 854,858. PATENTED MAY 28, 1907.
R. B. WAITE.
STARTING DEVICE FOR AUTOMOBILES.
APPLICATION FILED JUNE 15, 1906.
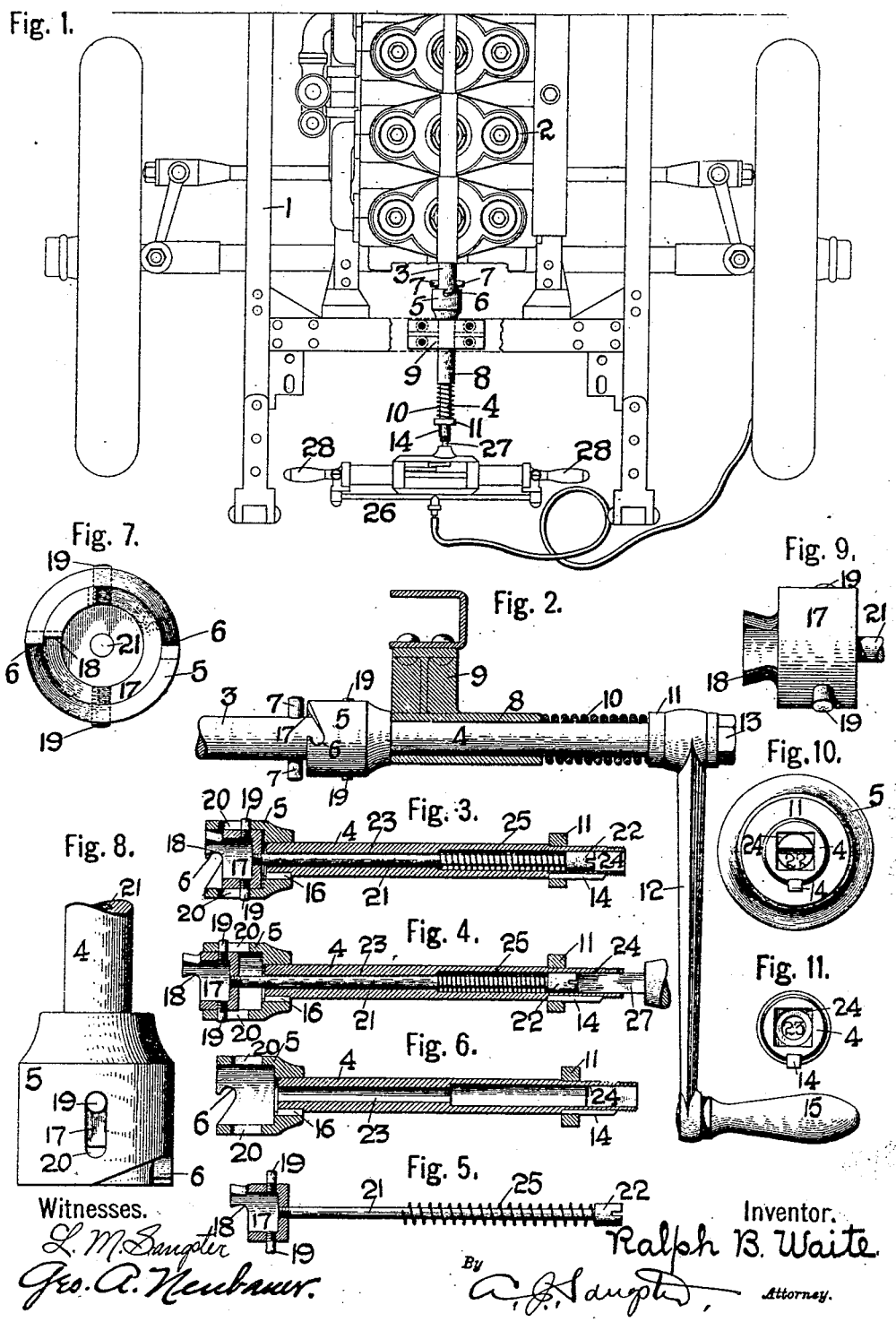

UNITED STATES PATENT OFFICE.

RALPH B. WAITE, OF SPRINGVILLE, NEW YORK.

STARTING DEVICE FOR AUTOMOBILES.

No. 854,858.          Specification of Letters Patent.          Patented May 28, 1907.

Application filed June 15, 1906. Serial No. 321,882.

*To all whom it may concern:*

Be it known that I, RALPH B. WAITE, a citizen of the United States, residing at Springville, in the county of Erie and State of New York, have invented a certain new and useful Improvement in Starting Devices for Automobiles, of which the following is a specification.

This invention relates to an improved starting device for automobiles which is provided with an element adapted for attachment to an air pump, a cleaning implement or like device.

The object of the invention is to provide means for utilizing the starting device as a power transmitting device for transmitting power from the engine of the automobile to any suitable device such for instance as an air pump for inflating the tires of the automobile.

The invention also relates to certain novel details of construction of the starting device, all of which will be fully and clearly hereinafter described and claimed reference being had to the accompanying drawings, in which,—

Figure 1, is a plan view of the front end of an automobile of conventional type equipped with the improved starting device, the inclosing hood being removed and a portion of the automobile mechanism broken away to more fully disclose the invention. Fig. 2, is a detached side view of the improved starting device and a fragment of the crank shaft a section being shown through the supporting bracket. Fig. 3, is a central longitudinal section through the improved starting device, the crank being removed. Fig. 4, is a view similar to Fig. 3, showing the inner clutch member moved into position to engage with the clutch pin on the crank shaft. Fig. 5, is a detached side view of the inner shaft showing a section through the inner clutch member. Fig. 6, is a central longitudinal section through the tubular shaft and the outer clutch member. Fig. 7, is an enlarged detached inner end view of the improved starting device, the crank being removed. Fig. 8, is an enlarged detached fragmentary plan view of the inner end of the improved starting device. Fig. 9, is an enlarged detached side view of the inner clutch member, showing a fragment of its shaft. Fig. 10, is an enlarged detached outer end view of the improved starting device, the crank being removed. Fig. 11, is an enlarged detached outer end view of the tubular shaft of the improved starting device.

In referring to the drawings in detail like numerals designate like parts.

In Fig. 1, of the accompanying drawings, a fragment of an automobile is shown in which 1, designates the frame; 2, the engine and 3, the engine shaft.

The improved starting device consists of a tubular shaft 4, having an enlarged inner end portion or clutch member 5, provided with clutch shoulders 6, which are adapted to engage with a clutch pin 7, on the crank shaft 3. The tubular shaft 4, is rotatably supported in a sleeve 8, which forms part of a bracket 9, depending from the automobile frame 2, see Figs. 1 and 2, and said tubular shaft extends beyond the front end of the sleeve 8, being encircled by a stiff coiled spring 10, which is held in place between the sleeve 8, and a collar 11, keyed to the tubular shaft near its outer end.

A crank 12, is removably secured upon the outer end of the tubular shaft 4, being held in place by a nut 13, and secured against independent rotation on the shaft by a feather or key 14. The crank has a handle 15, at its other end, by means of which the starting device is operated.

The clutch member 5, which will hereinafter be termed the outer clutch member is preferably made independent of the tubular shaft 4, and then fastened thereto by a key 16, but if desired, they may be made in one integral piece of metal. This outer clutch member is hollow and an inner clutch member 17, having a clutching shoulder 18, is seated within the outer clutch member, and is normally concealed therein. The inner clutch member 17, is secured to the outer clutch member 5, so as to rotate therewith by two oppositely extending pins 19, which are rigidly seated in the inner clutch member and project into longitudinal slots 20, in the outer clutch member. By this means the inner clutch member is rotatively locked to the outer clutch member and at the same time has an independent longitudinal sliding movement within said outer clutch member.

The tubular shaft 4, has a central longitudinal opening through which an inner shaft 21, extends, said shaft having its inner end secured to the inner clutch member 17, and its outer end provided with an enlarged head 22. The inner portion of this opening from about its middle to its inner end is of reduced diameter as shown at 23, while for a short distance from its outer end it is made in square form as shown at 24, in Figs. 3, 4, 5, 10 and 11. A comparatively weak coiled spring 25, encircles the inner shaft 21, between its enlarged head 22, and the shoulder formed by reducing the opening, see Figs. 3 and 4.

The inner clutch member 17, is hollow and forms a seat in which the end of the crank shaft 3, seats, see Figs. 1 and 2.

The operation of this improved starting device is as follows,—When it is desired to start the engine of the automobile the operator pushes the starting device inwardly against the tension of the spring 10, until the clutch members 5 and 17, engage with the clutch pin 7, on the crank shaft 3, then grasps the handle 15, and gives a sharp turn to the crank 12, thereby rotating the tubular shaft 4, and by means of the clutch device, the crank shaft of the engine and starting the engine in the usual manner. When the engine is in operation, and it is desired to transmit power therefrom to a suitable cleaning device, or for instance an air pump for inflating the automobile tires, the crank 12, is removed by unscrewing the nut 13, and a pump 26, of suitable design having a square shaft 27, is attached to the starting device by inserting the square shaft 27, in the square opening 24, in the outer end of the tubular shaft 4. The pump 26, is grasped by the handles 28, and pushed inwardly toward the starting device thereby causing the end of the square shaft 27, to meet the enlarged head 22, of the inner shaft 21, and move said shaft against the tension of the spring 25, until the inner clutch member 17, engages with the clutch pin 7, on the crank shaft 3. This rotates the inner clutch member 17, which in turn rotates the outer clutch member 5, by means of the pins 19, and causes the tubular shaft 4, to revolve. This motion is transmitted to the square shaft 27, thereby operating the pump 26. When it is desired to stop the pump the square shaft 27, is with-drawn, thereby permitting the spring 25, to disengage the inner clutch member 17, from the clutch pin 7, and stop the rotation of the tubular shaft 4.

Various machines, articles or utensils besides an air pump may be operated by this device and we therefore reserve the right to its use for all purposes.

I claim as my invention—

1. The combination with a starting device for automobiles having a removable crank, and a shaft normally disconnected from the engine, of a supplementary power transmitting element to which an air pump or the like may be connected.

2. The combination with a starting device for automobiles having a removable crank, and a shaft normally disconnected from the engine, of a supplementary power transmitting element supported by said shaft to which an air pump or the like may be connected.

3. The combination with a starting device for automobiles having a removable crank, and a tubular shaft normally disconnected from the engine, of a supplementary power transmitting element within the tubular shaft having means for engagement to the engine and to which an air pump or the like may be connected.

4. The combination with a starting device for automobiles having a removable crank, and a tubular shaft having an enlarged end portion provided with a notched edge for engagement with the shaft of the automobile engine and means for normally maintaining the shaft disengaged from the engine shaft, of a supplementary power transmitting element within the tubular shaft and having an enlarged end portion within the enlarged end portion of the tubular shaft provided with a notched edge for engagement with the shaft of the automobile engine.

5. The combination with a starting device for automobiles having a removable crank, and a tubular shaft having an enlarged end portion provided with a notched edge for engagement with the shaft of the automobile engine and one or more slots and means for normally maintaining the shaft disengaged from the engine shaft, of a supplementary power transmitting element within the tubular shaft and having an enlarged end portion within the enlarged end portion of the tubular shaft provided with a notched edge for engagement with the shaft of the automobile engine and pins projecting in the slots to prevent independent rotation.

RALPH B. WAITE.

Witnesses:
B. C. McINERNEY,
P. W. MEYERS.